(12) United States Patent
Campbell

(10) Patent No.: US 10,013,961 B1
(45) Date of Patent: Jul. 3, 2018

(54) MUSICAL NOTATION SYSTEM FOR PIANO

(71) Applicant: Sean Campbell, Santa Monica, CA (US)

(72) Inventor: Sean Campbell, Santa Monica, CA (US)

( * ) Notice: Subject to any disclaimer, the term of this patent is extended or adjusted under 35 U.S.C. 154(b) by 0 days.

(21) Appl. No.: 15/410,719

(22) Filed: Jan. 19, 2017

(51) Int. Cl.
*G09B 15/08* (2006.01)
*G10G 1/02* (2006.01)
*G09B 15/02* (2006.01)

(52) U.S. Cl.
CPC ............. *G10G 1/02* (2013.01); *G09B 15/026* (2013.01)

(58) Field of Classification Search
CPC ........ G09B 15/00; G09B 15/009; G10H 1/20; G10H 2220/106; G10H 2220/116; G10H 2220/231; G10H 2220/015; G10H 2220/066; G10H 2220/126; G10H 2220/121; G10H 2220/041; G10G 1/04; G10C 3/28
See application file for complete search history.

(56) References Cited

U.S. PATENT DOCUMENTS

| | | | |
|---|---|---|---|
| 7,253,349 B1 * | 8/2007 | Saltsman | G10C 3/12 84/423 R |
| 8,558,098 B1 * | 10/2013 | Mauldin | G09B 15/08 84/478 |
| 8,835,737 B2 | 9/2014 | King | |
| 8,987,573 B1 * | 3/2015 | Lippens | G09B 15/002 84/423 R |
| 2007/0089590 A1 * | 4/2007 | Katou | G09B 15/08 84/609 |
| 2010/0005952 A1 * | 1/2010 | LaMon | G09B 15/08 84/478 |
| 2011/0192270 A1 * | 8/2011 | Saxby | G09B 15/026 84/483.2 |
| 2014/0260898 A1 * | 9/2014 | Bales | G09B 15/026 84/433 |
| 2014/0305284 A1 * | 10/2014 | Cosgrove | G09B 15/001 84/478 |
| 2015/0027298 A1 * | 1/2015 | Simpson | G10G 1/02 84/478 |

\* cited by examiner

*Primary Examiner* — Marlon Fletcher
(74) *Attorney, Agent, or Firm* — Thomas I. Rozsa

(57) ABSTRACT

A new method of written music using a color coded keyboard to show the player which octave on the keyboard to use, which note in the octave to play and the finger of the hand used to play the note. The phrasing of the melody and chord progressions are indicated by the spacing of the notes in the tablature.

5 Claims, 4 Drawing Sheets
(2 of 4 Drawing Sheet(s) Filed in Color)

MUSICAL NOTATION SYSTEM FOR PIANO

BACKGROUND OF THE INVENTION

1. Field of the Invention

The present invention relates to the field of music, and in particular, to systems for writing and teaching how to play a musical instrument. More particularly, the present invention relates to the field of playing a piano.

2. Description of the Prior

The following patent is the closest prior art known to the inventor:

U.S. Pat. No. 8,835,737 issued to Kalvin King on Sep. 16, 2014 for PIANO TABLATURE SYSTEM AND METHOD ("King Patent"). The King Patent is different from the present invention.

SUMMARY OF THE INVENTION

The present invention is a new innovative form of musical notation system where instead of using standard sheet music with a treble clef and bass clef when playing the piano, the present invention converts the notes of music into a colored tablature format wherein a person can easily learn to play a piano, both acoustic and electric, by understanding the colored tablature format of the present invention The present invention is a new form of musical notation that indicates where one should place their fingers upon the piano keyboard using a system that color codes each note.

The inventor, Sean Campbell, is a music teacher. The inventor has noticed that there are many people who dream of playing their favorite songs on the piano but do not ever try to play music because they are under the impression that they must first learn how to read sheet music.

It has been discovered that there are many people who could become pianists, but because they are intimidated by a perceived requirement to learn how to read standard music notation, they never attempt to play a piano.

The present invention is a new method of notating music using a color coded keyboard to show the player which octave on the keyboard to use, which note in the octave to play and the finger of the hand used to play the note. Through use of the new, novel and non-obvious method, anyone can play their favorite songs, become a fine musician and develop a complete understanding of music theory without ever reading a single note of music.

In addition, the phrasing of the melody and chord progressions are indicated by the spacing of the notes in the tablature.

The written tablature is accompanied by a musical recording of the piano piece to be played to enable the learner to understand the time signature and note value, by way of example, a sixteenth note, eighth note, quarter note, half note and whole note. The present invention is primarily focused on learning to the play the musical piece by ear through listening to the musical composition being played while reading the musical tablature notation.

Therefore, it is an object of the present invention to convert standard sheet music into a tablature format that is color coded and easy to understand so that a person can learn to play the piano or any other comparable keyboard instrument where instead of having to read sheet music, an individual can follow the octave where the color of the octave matches the color of a note to be played with the specific note inside a color symbol (also called tablature note) matching the color of the octave, with the specific finger of the hand to play the note written above the colored tablature note in which the note is written.

It is a further object of the present invention, to have a method to teach the piano player (such as a student) wherein the piano player is only required to match the color in the note with a corresponding octave in the same color and then match the finger for that note with the number above the color matched symbol.

It is a further object of the present invention to enable a learner to play the piano without learning to read conventional treble clef and bass clef music by learning what note to play with a specific finger in a specific octave and learning the note value and note timing by listening to the music composition being played and learning by ear.

Defined in detail, the present invention is a system to learn to play music on a piano, comprising: (a) an illustration of seven octaves of a piano keyboard, with music natural notes in each octave illustrated in a separate color for each octave illustrated in ascending order, a first lowest octave in a first color, a second octave in a second separate color, a third octave in a third separate color, a fourth octave being a middle C octave in a fourth separate color, a fifth octave in a fifth separate color, a sixth octave in a sixth separate color and a seventh and highest octave in a seventh separate color; (b) sharp notes and flat notes in the piano keyboard in each of the seven octaves are illustrated in a black color; (c) a tablature note illustrated in the same color as an octave in which the tablature note is played, a specific note selected from the group consisting of C, C-Sharp, D, D-Sharp, E, F, F-Sharp, G, G-Sharp, A, A-Sharp, and B illustrated within a colored tablature, a number selected from the group consisting of 1 for thumb, 2 for forefinger, 3 for middle finger, 4 for ring finger and 5 for thumb illustrated above the tablature notation; (d) a music signature sheet with a horizontal line separating right hand above the line and left hand below the line, spaced apart vertical lines extending above, intersecting and below each horizontal line to separate each musical measure; (e) each colored tablature note spaced apart from each other colored tablature note in a horizontal order for separate notes played successively, at least two colored tablature notes spaced apart in a vertical column for notes played together as a chord; (f) each colored tablature note played with a finger of a right hand depicted above said horizontal line and each tablature note played with a finger of a left hand depicted below said horizontal line, with a colored tablature note played separately spaced apart from each other colored tablature note, each respective tablature note played concurrently with a finger of a right hand and a finger of a left hand in a same vertical column, and colored tablature notes played concurrently set in a vertical column above the horizontal line, set in a vertical column below the horizontal line, or in a vertical column above and below a horizontal line; and (g) a recording a the music to demonstrate colored tablature note value.

Defined more broadly, the present invention is a system to learn to play music on a keyboard, comprising: (a) an illustration of a multiplicity of octaves of a keyboard, with music natural notes in each octave illustrated in a separate color for each octave illustrated in ascending order from lowest octave to highest octave; (b) sharp notes and flat notes in the keyboard in each of the multiplicity of octaves illustrated in at least one separate color distinct from the colors of the octaves; (c) a tablature note illustrated in the same color as an octave in which the tablature note is played, a specific note selected from the group consisting of C, C-Sharp (D-Flat), D, D-Sharp (E-Flat), E, F, F-Sharp (G-Flat), G, G-Sharp (A-Flat), A and B illustrated within a colored tablature, a separate number designated for the fingers of a right hand with a separate number for the thumb, a separate number for the forefinger, a separate number for the middle finger, a separate number for the ring finger, a separate number for the pinky and a separate number designated for the fingers of the left hand with a separate number for the thumb, a separate number for the forefinger, a separate number for the middle finger, a separate number for the ring finger, a separate number for the pinky; (d) a music signature sheet with a horizontal line separating a right hand above the line and left hand below the line, spaced apart vertical lines extending above, intersecting and below each horizontal line; and (e) each colored tablature note spaced apart from each other tablature note in a horizontal order for separate notes played successively, at least two colored tablature note spaced apart from other tablature note in a vertical column for notes played together.

Defined most broadly, the present invention is a system to learn to play music on a keyboard, comprising: (a) an illustration of a multiplicity of octaves of a keyboard, with music natural notes in each octave illustrated in a separate color for each octave illustrated in ascending order from lowest octave to highest octave; (b) sharp notes and flat notes in the keyboard in each of the multiplicity of octaves illustrated in at least one separate color distinct from the colors of the octaves; (c) a tablature note illustrated in the same color as an octave in which the tablature note is played, a specific note selected from the group consisting of natural notes and sharp and flat notes illustrated within a colored tablature, a separate number designated for the fingers of a right hand with a separate number for the thumb, a separate number for the forefinger, a separate number for the middle finger, a separate number for the ring finger, a separate number for the pinky and a separate number designated for the fingers of the left hand with a separate number for the thumb, a separate number for the forefinger, a separate number for the middle finger, a separate number for the ring finger, a separate number for the pinky; (d) a music signature sheet with at least a horizontal line separating a right hand above the line and left hand below the line, and (e) each colored tablature note spaced apart from each other tablature note in a horizontal order for separate notes played successively, at least two colored tablature notes spaced apart from other tablature note in a vertical column for notes played together.

Further novel features and other objects of the present invention will become apparent from the following detailed description, discussion and the appended claims, taken in conjunction with the drawings.

BRIEF DESCRIPTION OF THE DRAWINGS

The patent application file contains at least one drawing executed in color. Copies of this patent application publication with color drawings will be provided by the Office upon request and payment of the necessary fee.

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
FIG. 1 is a copy of a portion of a public domain sheet of music for a musical composition entitled "FUR ELISE" written in standard music notes for both treble clef and bass clef.

Referring to FIG. 1, there is illustrated a copy of a portion of a public domain sheet of music for a musical composition entitled "FUR ELISE" written in standard music notes for both treble clef and bass clef.

Figure 2:
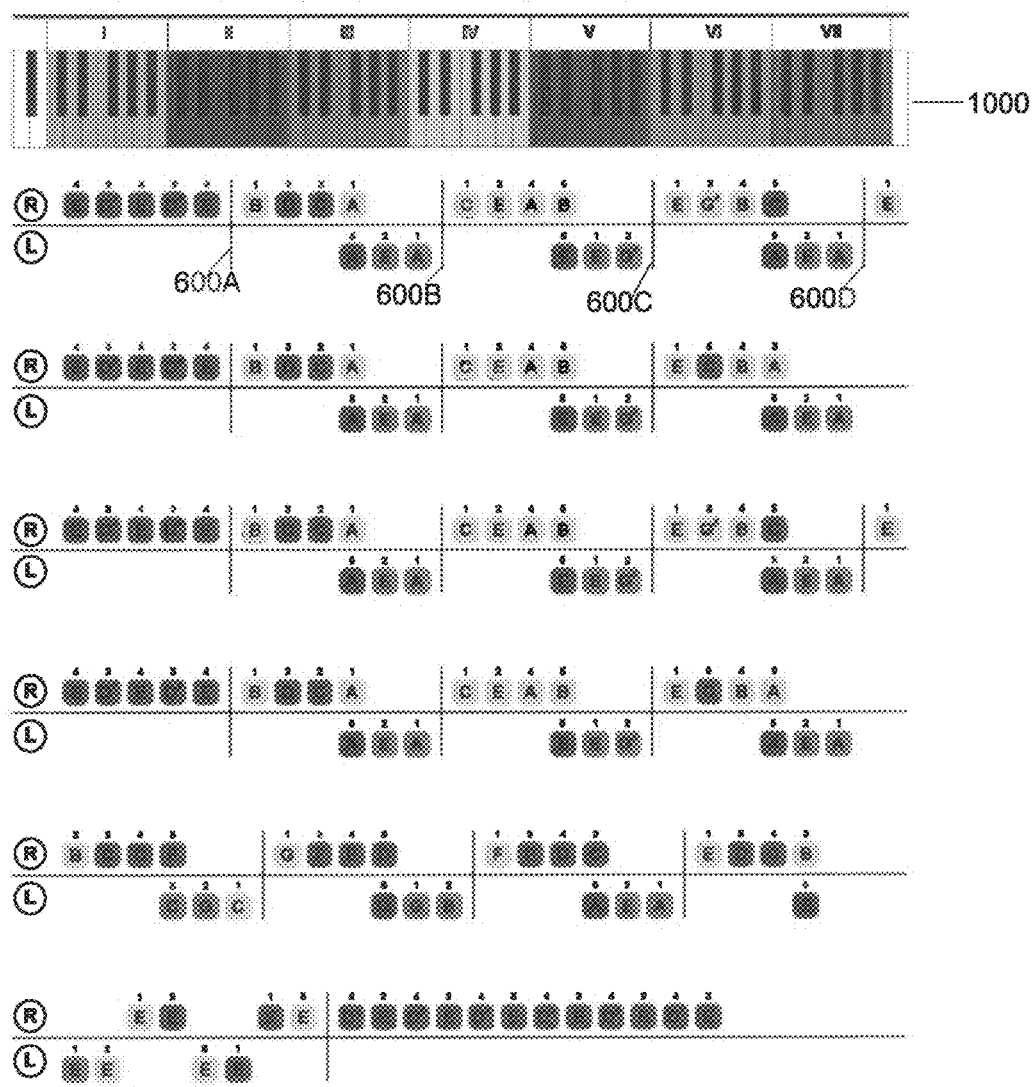
FIG. 2 is an example of the present invention musical notation converting a portion of the corresponding notes of "FUR ELISE" into the color coded keyboard and music tablature notation system of the present invention.

Referring to FIG. 2, there is illustrated an example of the present invention musical notation converting corresponding portions of the corresponding notes of "FUR ELISE" into the color coded keyboard and music tablature notation system of the present invention. Further referring to FIG. 2, there is illustrated an example of the present invention wherein a piece of music written in right hand treble clef and left hand bass clef is converted into the present invention innovative notation tablature.

There is a horizontal line 500 with the letter "R" in a circle in the leftmost column above horizontal line 500 indicating tablature notes above the horizontal line 500 to be played with fingers of the right hand. In addition, there is a letter "L" in a circle in the left most column below the horizontal line 500 indicating tablature notes below the horizontal line 500 to be played with fingers of the left hand. A multiplicity of spaced apart vertical lines, numbered 600A, 600B 600C and 600D, extending above, intersecting and extending below horizontal line 500 illustrate separate music phrasing within the line of tablature notes.

Still referring to FIG. 2, at the top of the sheet there is depicted a color combination keyboard where each octave is colored a different color. By way of example only and not limitation, the natural notes for the middle C octave IV are colored yellow. The octaves above the middle C octave, going in ascending order on the keyboard 1000, have the natural notes respectively colored blue V, orange VI and purple VII. The octaves below the middle C octave, going in descending order on the keyboard 1000, have the natural notes respectively colored red III, green II and beige I. It will be appreciated that it is within the spirit and scope of the present invention to use any other color for each octave, so long as the respective octaves are a different color. It is preferable for adjacent octaves to be in contrasting colors, such as red, yellow and blue. Sharp notes and flat notes in the piano keyboard in each of the seven octaves are illustrated in a black color. It is within the spirit and scope of the present invention for sharp notes and flat notes to be any color contrasting the natural notes. Sharp notes and flat notes are also in the colored tablature notes with the color matching the octave in which the sharp or flat note is played.

Optionally, it is preferable to have the notes in the colored tablature stand out against the tablature coloration to clearly display the notes within the color tablature note. Therefore, while the colors of the octaves as set forth above are an acceptable example, in addition to having any colors for the octaves, it is within the spirit and scope of the present invention to have octave colors and matching note tablature colors in very bright colors to clearly see the note in each tablature color. The adjacent octaves preferably have bright colors and visibly contrasting colors.

The tablature involves coloring a specific octave and then on the tablature note, making it the same color as the octave to be played with the specific note of music set within the tablature color. In addition, above the color with the letter of the note to be played, there is a number which designates the finger of the hand on which that note is to be played. 1 is thumb, 2 is forefinger, 3 is middle finger, 4 is ring finger and 5 is pinky. The finger number is the same for right and left hand, it being understood that the right hand is primarily used to play the treble clef notes and the left hand is primarily used to play the bass clef notes. While the bass clef notes are shown below the horizontal line and the treble clef notes are shown above the horizontal line, it is also within the spirit and scope of the present invention for bass clef notes to be played with the left hand going above the right hand into the treble clef and it is also within the spirit and scope of the present invention for the treble clef notes played with the right hand to go into the bass clef notes to be played below the left hand. Multiple combinations of left hand, right hand, combined both above and below the horizontal line are also within the spirit and scope of the present invention depending upon the nature of the piece of music.

Figure 3:
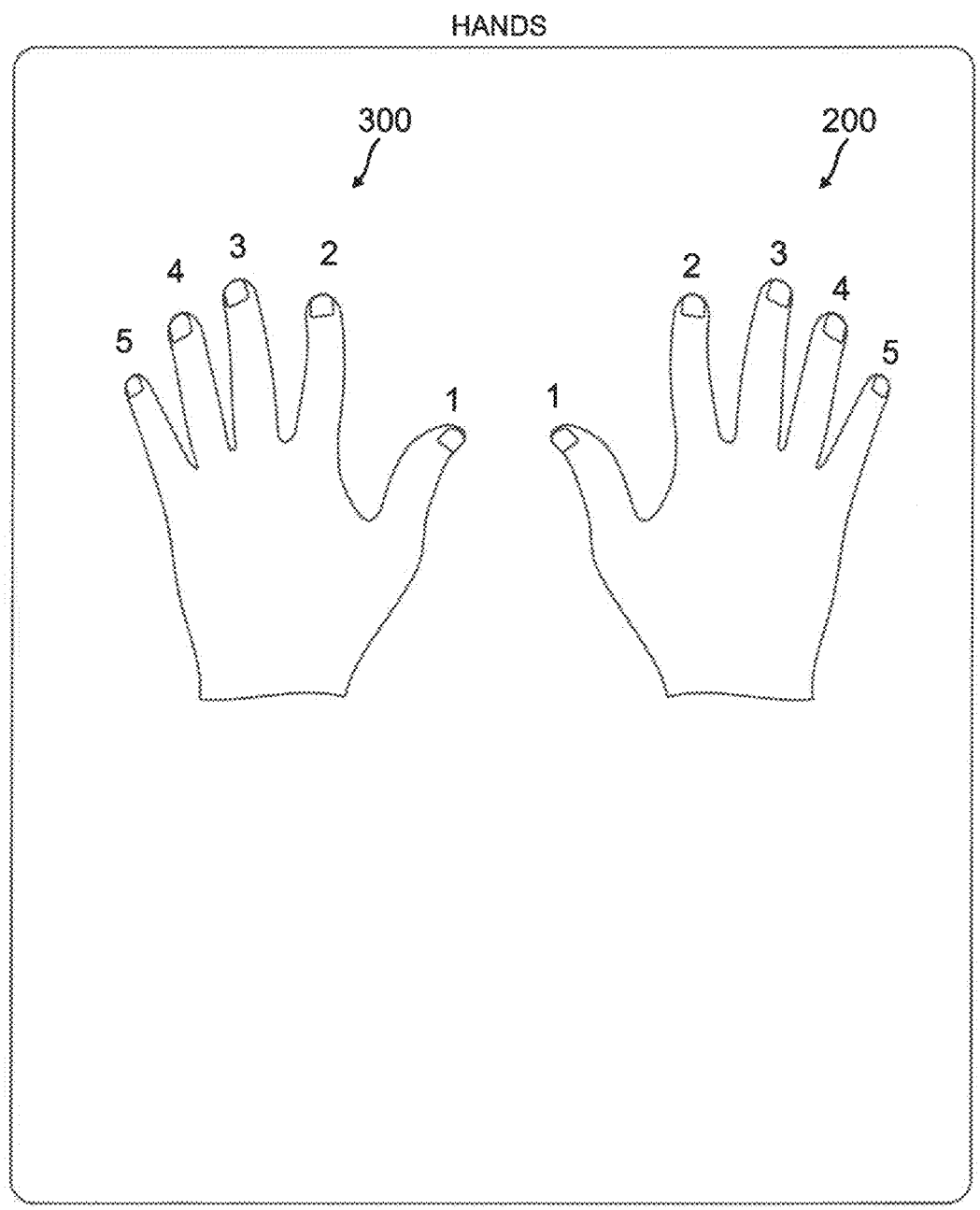
FIG. 3 is a picture of the fingers of both the left and the right hand illustrating the fingers of the left hand and the fingers of the right hand with a number above each finger, the number indicating which finger is used to play a tablature note.

Since the piano is played with both the right hand for treble clef and the left hand for bass clef, the respective numbers are the same for each respective corresponding finger of the right hand and the left hand. Referring to the picture of the left hand and five fingers and the right hand and five fingers illustrated in FIG. 3, the right hand is numbered 200 and the left hand is numbered 300. There is a number which designates the fingers of the hand on which a tablature note is to be played: 1 is thumb for the right hand and 1 is thumb for the left hand; 2 is forefinger for the right hand and 2 is forefinger for the left hand; 3 is middle finger for the right hand and 3 is middle finger for the left hand; 4 is ring finger for the right hand and 4 is ring finger for the left hand; and 5 is pinky for the right hand and 5 is pinky for the left hand. This numbering system is preferred. It is also within the spirit and scope of the present invention for the fingers to be designated with different numbers and also the fingers of the left hand may have different numbers from the fingers of the right hand.

The notes on the piano and/or keyboard include C, C-Sharp (D-Flat), D, D-Sharp (E-Flat), E, F, F-Sharp (G-Flat), G, G-Sharp (A-Flat), A and B.

While the present application is primarily concentrating on the piano, it is understood that the present invention also encompasses any keyboard instrument which include acoustic piano, electric piano, the keyboard of an organ, especially such as an older organ such as the Hammond B3 which does not have foot movement but only stops and keyboard, and also can include double keyboards which may be set to different pitches or tones, and synthesizers.

Referring to FIG. 1, the first eight treble clef notes are E, D-Sharp, E, D-Sharp, E, B, D, C for the first quarter measure and the first full measure. Then for the second full measure, the treble clef continues with an A, a bass clef roll with A concurrent with the treble clef A, then E and high A in the bass clef followed by right hand middle C octave, E bass A, followed in the next measure with treble clef B and concurrent left hand E and next left hand octave for E and G.

Referring to FIG. 2, matching the notes using the present invention color tablature notes, for the first two phrases, the first five tablature notes are colored blue for the octave V above middle C, with the notes being E, D-Sharp, E, D-Sharp, and with respective numbers 4, 3, 4, 3, and 4 showing the notes successively played with right hand ring finger, middle finger, ring finger, middle finger and ring finger. The next tablature note B is colored yellow for the middle C octave IV and the number 1 above it for the thumb to play C in the middle C octave IV. Then two blue tablature notes D and C, with respective numbers 3 (middle finger) and 2 (forefinger) played in octave V with the right hand, then yellow tablature note A in the yellow middle C octave IV, with concurrent left hand bass clef A in green octave II with number 5 above it for playing the note with a left hand pinky finger and two red tablature notes E and A with respective numbers 2 and 1 to play the notes in octave II with respective forefinger and thumb.

For the third phrase, there are four yellow tablature notes meaning yellow middle C octave IV with respective notes in the yellow tablature and respective numbers and right hand fingers C-1 (thumb), E-2 (forefinger), A-4 (ring finger) and B-5 (pinky). Concurrent with the last tablature note, there is a green tablature note for E and number 5 to be played with the left pinky and successive left hand notes in red, E-1 (thumb) and G-2 (forefinger).

Therefore, the present invention tablature notation system converts sheet music into easy-to-understand and easy-to-learn-to-play colored note tablature.

Figure 4:
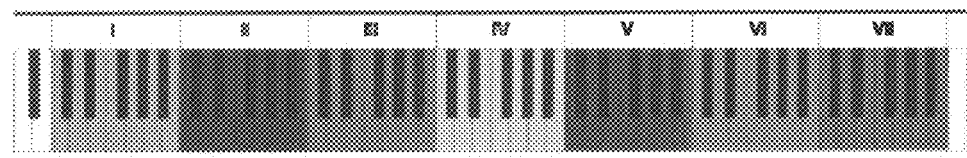
FIG. 4 is an additional example of an unrelated sheet of music converted into the color coded keyboard and music tablature notes of the present invention having additional features from the present invention similar to the present invention system as illustrated in FIG. 2.
Figure 4:
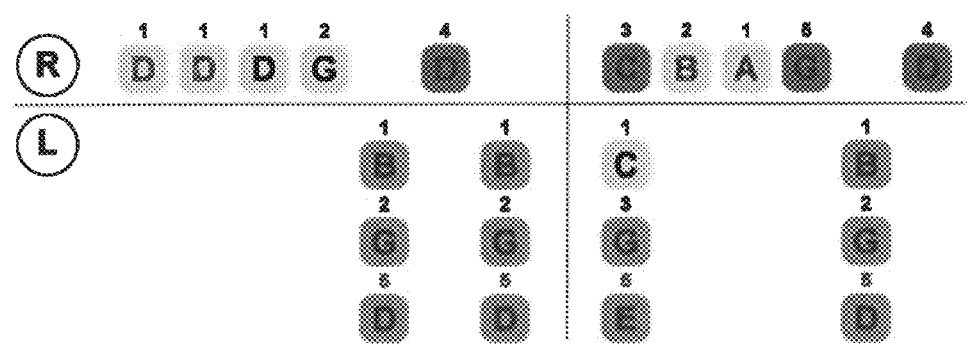
Figure 4:
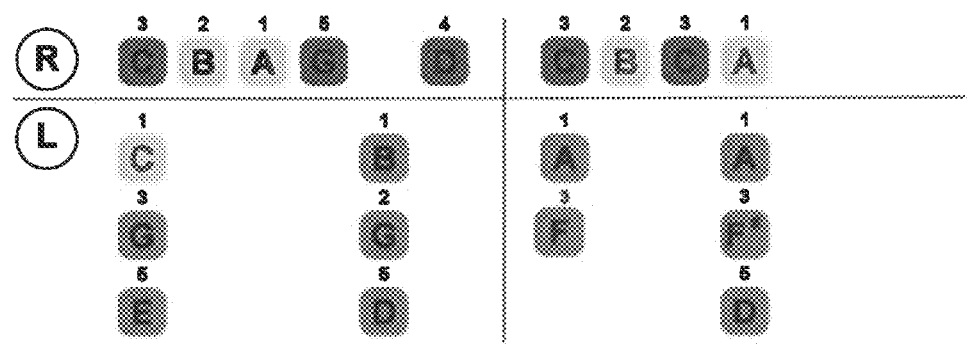

A more involved coloring tablature note system is illustrated in FIG. 4. Referring to FIG. 4, in the colors that are in the chart, the octave containing middle C is colored yellow. In the first four tablature notes on the left hand side in the treble clef, there are three yellow tablature notes, one after the other, which means that they are played separately one after the other, with the letter D in the first three tablature notes indicating that the note D is to be played in the middle octave and the number 1 above the letter D indicating that the thumb is to play that note. Similarly, the fourth yellow colored tablature note has the letter "G" within the yellows tablature note, indicating that the note G needs to be played in the middle octave and the number 2 above it indicating that the note needs to be played with the forefinger. There is a space and then to the right of the yellow tablature notes is a blue colored tablature note with the letter D within the blue colored tablature note and the number 4 above it. This means that the first octave above the middle C which is octave V is colored blue so that note G is to be played in octave V and the number 4 above the blue colored tablature note means that the ring finger of the right hand is used to play the note.

With respect to the left hand, it is the same sequence. For the first group that is shown, there is the color red and on the left hand with the letter B and the number 1 above the note. Therefore, the octave below the middle C octave III is to played with the B key to be played with the thumb of the left hand. Since there is a vertical orientation of colored tablature notes as illustrated in the left hand, the notes have to be played concurrently as a chord.

Using the chart in FIG. 4, for the first column, there is a red tablature note with the letter B inside and the number 1 above it, a red tablature note with the letter G inside and the number 2 above it and a red tablature with the letter D inside and the number 5 above it. The notes are played concurrently, B with the thumb of the left hand, G with the forefinger of the left hand and D with the pinky of the left hand. In the left hand first measure right hand column, in the first group, there are three red colored tablature notes, B, G, D with respective numbers 1, 2 and 5 above each respective tablature note, meaning B is to be played with the thumb, G is to be played with the forefinger and D is to be played with the pinky finger, all in the octave below the middle C, octave III. There could also be the same chord structure for the right hand as well.

Where there is a space in the right hand and only tablature notes on the left hand, it means only the left hand notes will be played. Where there is a note in the right hand and a space in the left hand, only the note in the right hand is to be played. Where there are tablature colored notes in both the left hand and the right hand, the notes in both hands are to be played. For example, in the second measure, upper left corner, there is a blue tablature note with the letter C inside and number 3 above which means the octave V above middle C is played with the middle finger and concurrently on the left hand the chord with the yellow tablature note with the letter C inside and the number 1 above which means the octave IV middle C for the left hand thumb, the red tablature note G with the number 3 to be played in octave III with the middle finger 3 and the red tablature note E with the number 5 above it means the note E is to be played in octave III with the pinky finger.

The written tablature is accompanied by a musical recording of the piano piece to be played to enable the learner to understand the time signature and note value, by way of example a sixteenth note, eighth note, quarter note, half note, and full note. For example, the music piece in FIG. 1 is played on a piano and recorded in a medium to be heard by a student. The medium is selected from the group including any recording and playback medium such as by way of example only, the group consisting of a CD, an MP3 player, and a streaming audio recorder. The present invention is primarily focused on learning to the play the musical piece by ear through listening to the musical composition being played while reading the musical tablature notation.

Of course, the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method to enable a person who does not know how to read a music composition written with music notes on piano sheet music in both treble clef and bass clef, to play the music composition, the method comprising:

a. obtaining at least one page of the music composition written with music notes on piano sheet music in both treble clef and bass clef, with the treble clef music notes separated by measures and the bass clef music notes separated by measures;

b. creating a color keyboard illustration of octaves of a piano keyboard, with music natural notes in each octave illustrated in a separate color for each octave illustrated in ascending order, a first lowest octave in a first color, a second octave in a second separate color, a third octave in a third separate color, a fourth octave being a middle C octave in a fourth separate color, a fifth octave in a fifth separate color, a sixth octave in a sixth separate color and a seventh and highest octave in a seventh separate color, further sharp notes and flat notes in each of the seven octaves illustrated in a black color;

c. creating a color tablature note illustrated in the same color as an octave in which the color tablature note is played, a specific color tablature note selected from the group consisting of C, C-Sharp, D, D-Sharp, E, F, F-Sharp, G, G-Sharp, A, A-Sharp, and B illustrated within the color tablature note, a separate number designated for the fingers of a right hand with a separate number for a thumb, a separate number for a forefinger, a separate number for a middle finger, a separate number for a ring finger, and a separate number for a pinky and a separate number designated for the fingers of a left hand with a separate number for a thumb, a separate number for a forefinger, a separate number for a middle finger, a separate number for the ring finger, and a separate number for a pinky;

d. creating a music notation sheet with a horizontal line separating right hand above the line and left hand below the line, spaced apart vertical lines extending above, intersecting and below each horizontal line to separate each musical measure;

e. transforming each treble clef music note in each measure into a transformed music notation character including a color tablature note set in a color of an octave of the piano in which the music note appeared in said piano sheet music, with a respective music note in the color tablature note matching the note in the music composition, writing a number for a finger of the right hand above each color tablature note for the finger used to play the note on the piano, breaking a group of color tablature notes into measures corresponding to the same measures for the same treble clef group of music notes, each color tablature note spaced apart from each other color tablature note in a horizontal order for separate notes played successively, at least two color tablature notes spaced apart in a vertical column for notes played together as a chord, breaking a group of color tablature notes into measures corresponding to the same measures for the same treble clef group of music notes;

f. transforming each bass clef music note in each measure into a transformed music notation character including a color tablature note set in a color of an octave of the piano in which the music note appeared in said piano sheet music, with a respective music note in the color tablature matching the note in the music composition, writing a number for a finger of the left hand above each color tablature note for the finger used to play the note on the piano, breaking a group of color tablature notes into measures corresponding to the same measures for the same bass clef group of music notes, each colored tablature note spaced apart from each other colored tablature note in a horizontal order for separate notes played successively, at least two color tablature notes spaced apart in a vertical column for notes played together as a chord, breaking a group of color tablature notes into measures corresponding to the same measures for the same bass clef group of music notes;

g. wherein each color tablature note played with a finger of a right hand depicted above said horizontal line and each tablature note played with a finger of a left hand depicted below said horizontal line, with a color tablature note played separately spaced apart from each other color tablature note, each respective tablature note played concurrently with a finger of a right hand and a finger of a left hand in a same vertical column, and color tablature notes played concurrently set in a vertical column above the horizontal line, set in a vertical column below the horizontal line, or in a vertical column above and below a horizontal line; and h. playing a recording of the music to demonstrate how the music composition will sound;

i. whereby, the music composition in piano sheet music is transformed into the music notation to enable a person, who does not know how to read piano sheet music, to play the music composition while reading the color tablature notes.

2. The method in accordance with claim 1, further comprising:

a. for the separate number designated for the fingers of a right hand, number 1 for a thumb, number 2 for a forefinger, number 3 for a middle finger, number 4 for a ring finger, and number 5 for a pinky; and b. for the separate number designated for the fingers of a left hand, number 1 for a thumb, number 2 for a forefinger, number 3 for a middle finger, number 4 for a ring finger, and number 5 for a pinky.

3. A method to enable a person who does not know how to read music notes on a visual image of music for a keyboard instrument, to play on a keyboard instrument a music composition appearing in the visual image of music in both treble clef and bass clef, the method comprising:

a. obtaining a visual image of music notes for a music composition visually appearing in treble clef music notes separated by measures and bass clef music notes separated by measures;

b. creating a visual image illustration of octaves of a piano keyboard, with music natural notes in each octave illustrated in a separate color for each octave illustrated in ascending order, a first lowest octave in a first color, a second octave in a second separate color, a third octave in a third separate color, a fourth octave being a middle C octave in a fourth separate color, a fifth octave in a fifth separate color, a sixth octave in a sixth separate color and a seventh and highest octave in a seventh separate color, further sharp notes and flat notes in each of the seven octaves illustrated in a black color;

c. creating a visual image of a color tablature note illustrated in the same color as an octave in which the color tablature note is played, a specific note selected from the group consisting of C, C-Sharp, D, D-Sharp, E, F, F-Sharp, G, G-Sharp, A, A-Sharp, and B illustrated within a color tablature note, a separate number designated for the fingers of a right hand with a separate number for a thumb, a separate number for a forefinger, a separate number for a middle finger, a separate number for a ring finger, and a separate number for a pinky and a separate number designated for the fingers of a left hand with a separate number for a thumb, a separate number for a forefinger, a separate number for a middle finger, a separate number for a ring finger, and a separate number for a pinky, each respective number adjacent a respective color tablature to designate which finger plays the color tablature note on the keyboard;

d. creating a visual image of a music signature with a horizontal line separating right hand above the line and left hand below the line, spaced apart vertical lines extending above, intersecting and below each horizontal line to separate each musical measure;

e. transforming each treble clef music note in each measure into a transformed music notation character including a color tablature note set in a color of an octave of the keyboard in which the music note appeared in said composition appearing in the visual image of music for a keyboard instrument, a respective music note in the color tablature note matching the note in the music composition, placing a number for a finger of the right hand within each color tablature note for the finger used to play the note on the keyboard instrument, breaking a group of color tablature notes into measures corresponding to the same measures for the same treble clef group of music notes, each color tablature note spaced apart from each other color tablature note in a horizontal order for separate notes played successively, at least two color tablature notes spaced apart in a vertical column for notes played together as a chord, breaking a group of color tablature notes into measures corresponding to the same measures for the same treble clef group of music notes;

f. transforming each bass clef music note in each measure into a transformed music notation character including a color tablature note set in a color of an octave of the keyboard in which the music note appeared in said composition appearing in the visual image of music for a keyboard instrument, a respective music note in the color tablature note matching the note in the music composition, placing a number for a finger of the right hand within each color tablature note for the finger used to play the note on the keyboard instrument, breaking a group of color tablature notes into measures corresponding to the same measures for the same bass clef group of music notes, each color tablature note spaced apart from each other color tablature note in a horizontal order for separate notes played successively, at least two color tablature notes spaced apart in a vertical column for notes played together as a chord, breaking a group of color tablature notes into measures corresponding to the same measures for the same bass clef group of music notes; and g. wherein each color tablature note played with a finger of a right hand depicted above said horizontal line and each tablature note played with a finger of a left hand depicted below said horizontal line, with a color tablature note played separately spaced apart from each other color tablature note, each respective tablature note played concurrently with a finger of a right hand and a finger of a left hand in a same vertical column, and color tablature notes played concurrently set in a vertical column above the horizontal line, set in a vertical column below the horizontal line, or in a vertical column above and below a horizontal line;

h. whereby, the music composition in the visual image of music notes is transformed into the music notation to enable a person, who does not know how to read a visual image of music, to play the music composition while reading the visual image of music notation.

4. The method in accordance with claim 3, further comprising: a recording of the music to demonstrate how the music composition will sound.

5. The method in accordance with claim 3, further comprising:

a. for the separate number designated for the fingers of a right hand, number 1 for a thumb, number 2 for a forefinger, number 3 for a middle finger, number 4 for ring finger, and number 5 for a pinky; and
b. for the separate number designated for the fingers of a left hand, number 1 for a thumb, number 2 for a forefinger, number 3 for a middle finger, number 4 for ring finger, and number 5 for a pinky.

\* \* \* \* \*